(12) United States Patent
Viohl et al.

(10) Patent No.: US 12,005,953 B2
(45) Date of Patent: Jun. 11, 2024

(54) STEERING COLUMN

(71) Applicant: Volkswagen Aktiengesellschaft, Wolfsburg (DE)

(72) Inventors: Arne Viohl, Wolfsburg (DE); Thomas Kiesewetter, Braunschweig (DE); Thomas Fricke, Danndorf (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 17/641,329

(22) PCT Filed: Aug. 20, 2020

(86) PCT No.: PCT/EP2020/073428
§ 371 (c)(1),
(2) Date: Mar. 8, 2022

(87) PCT Pub. No.: WO2021/047888
PCT Pub. Date: Mar. 18, 2021

(65) Prior Publication Data
US 2022/0324504 A1    Oct. 13, 2022

(30) Foreign Application Priority Data
Sep. 9, 2019  (DE) .......................... 102019213669.9

(51) Int. Cl.
*B62D 1/16* (2006.01)
*B60K 20/06* (2006.01)
(Continued)

(52) U.S. Cl.
CPC ............... *B62D 1/16* (2013.01); *B60K 20/06* (2013.01); *B62D 1/10* (2013.01); *B60Q 1/1469* (2013.01); *B60R 2011/001* (2013.01); *B62D 1/12* (2013.01)

(58) Field of Classification Search
CPC ..... B62D 1/12; B62D 1/16; B62D 1/10; B60K 20/06; B60R 2011/001; B60Q 1/0082; B60Q 1/1469; B60Q 3/283
See application file for complete search history.

(56) References Cited

U.S. PATENT DOCUMENTS 6,492,744 B1 * 12/2002 Rudolph ............... B60Q 1/1476
                                                  280/727
7,819,427 B2 * 10/2010 Hirschfeld ........... B60Q 1/1461
                                                  200/61.54
(Continued)

FOREIGN PATENT DOCUMENTS

CN       101668660 A      3/2010
CN       106585711 A      4/2017
(Continued)

OTHER PUBLICATIONS

PCT/EP2020/073428. International Search Report (Oct. 14, 2020).
Corresponding CN Application No. 202080063035.3. Office Action (Jan. 31, 2024).

*Primary Examiner* — Adam D Rogers
(74) *Attorney, Agent, or Firm* — Peter Zura; LOZA & LOZA, LLP

(57) ABSTRACT

A steering column with a switch module at least partially surrounding the steering column. The switch module includes at least one actuating lever for activating at least one function. A mechanical interface for attaching at least one bracket for an object is provided in the area of the switch module. The interface is configured as a separate component mounted on the switch module.

13 Claims, 5 Drawing Sheets

(51) Int. Cl.
  *B60Q 1/14*    (2006.01)
  *B60R 11/00*   (2006.01)
  *B62D 1/10*    (2006.01)
  *B62D 1/12*        (2006.01)

(56) References Cited

U.S. PATENT DOCUMENTS

| | | | | |
|---|---|---|---|---|
| 7,910,846 | B2* | 3/2011 | Son | B62D 1/16 |
| | | | | 200/61.54 |
| 9,598,100 | B2* | 3/2017 | Lenkenhoff | B62D 1/16 |
| 2002/0134610 | A1* | 9/2002 | Pastwa | B60Q 1/1461 |
| | | | | 180/315 |
| 2009/0114512 | A1 | 5/2009 | Son | |

FOREIGN PATENT DOCUMENTS

| | | | | |
|---|---|---|---|---|
| CN | 106882257 A | 6/2017 | | |
| CN | 108819866 A | 11/2018 | | |
| CN | 109050423 A | 12/2018 | | |
| DE | 102010015656 A1 * | 10/2011 | ............ | B60Q 1/1461 |
| DE | 102019200150 A1 * | 7/2020 | ............. | B62D 1/184 |
| EP | 0688032 B1 * | 1/1998 | | |
| EP | 1783004 A1 | 5/2007 | | |

\* cited by examiner

STEERING COLUMN

RELATED APPLICATIONS

The present application claims priority to International Patent App. No. PCT/EP2020/073428 to Viohl, et al., titled "Steering Column", filed Aug. 20, 2020, which claims priority to German Patent App. No. 10 2019 213 669.9, filed on Sep. 9, 2019, the contents of each being incorporated by reference in their entirety herein.

TECHNICAL FIELD

The present disclosure relates to a steering column comprising a switch module, which at least partially surrounds a steering column and includes at least one actuating lever for triggering at least one function, characterized in that a mechanical interface for attaching at least one mounting for an object is present in the region of the switch module, which is configured as a separate component attached to the switch module.

BACKGROUND

Steering columns having switch modules are known in the art. The switch module represents a module for switching various functions on and off, which is equipped with a dedicated electronics system. Functions such as windshield wipers, turn signals, high beams, cruise control system and the like can be activated by way of one or more present actuating levers. Typically, the switch module encloses the steering column in a form-locked manner in one location, so that a rotational movement of the steering column caused by a steering wheel is also transferred to a rotatable component within the switch module. In this way, functions can likewise be triggered or deactivated (for example, resetting of the turn signal).

A steering column in which an opening is introduced into a steering column shroud surrounding the steering column became known to the applicant from EP 1 783 004 A1. An electronic interface in the form of an electrical connector protrudes through the opening. The electrical connector is used to attach a mounting for an object in the form of a mobile electrical device. The mobile electrical device can be a diagnostic device, a cell phone, or an MP3 player, for example.

SUMMARY

Aspects of the present disclosure are to provide a steering column in which the basic requirement for the implementation of a stable mounting for an object is created in a simple and space-saving manner.

Certain aspects are described in a steering column having the features recited in the independent claims below. Advantageous embodiments or refinements of the invention will be apparent from the dependent claims.

The present disclosure is directed to a steering column comprising a switch module that at least partially surrounds the steering column. The switch module comprises at least one actuating lever for triggering at least one function.

In some examples, a mechanical interface is provided for attaching at least one mounting for an object in the region of a switch module. The mechanical interface is designed as a separate component attached to the switch module. In this way, the basic requirement for the creation of a reliable mounting for an object at the steering column can be provided in a very simple and space-saving manner. If, in certain designs of a motor vehicle, such a mounting for an object should not be required, the interface can be easily covered by a cover or a portion of a steering column shroud. Since the interface is designed as a separate component, necessary structural modifications at a present switch module can be minimized.

In some examples, the component may include a contour for attaching the mounting on the side of the mounting to be attached.

In this way, it is possible to easily to plug a mounting to be attached, which has a corresponding mating contour, into the contour of the component and pre-fix it.

In some examples, an assembly unit is disclosed for a steering column. The assembly unit may include a switch module (as described above) and a component attached to the switch module. The component has at least one contour which is formed by the outline of a depression, or by the outline of an integral molding, and which can be plugged into a mating contour of a mounting for an object which is formed by the outline of a depression, or by the outline of an integral molding.

In some examples, a motor vehicle is disclosed, which includes a steering column according to the present disclosure.

The figures provided herein show a preferred exemplary embodiments, which will be described in greater detail in the following description based on the figures. In this way, even further advantages of the invention will become apparent. Identical reference numerals, even if used in different figures, refer to identical, comparable or functionally equivalent components. In the process, corresponding or comparable properties and advantages are achieved, even if no repeat description or reference thereto is provided. The figures are not, or at least not always, true to scale. In some figures, proportions or distances may be illustrated in an exaggerated form to be able to highlight features of an exemplary embodiment more clearly.

BRIEF DESCRIPTION OF THE DRAWINGS

The drawings in each case show schematic illustrations of some aspects of the present disclosure.

DETAILED DESCRIPTION

In some examples described herein, in order to configure the component which forms the interface, and is used to attach a mounting for an object as compact as possible, the contour for attaching the mounting is formed by the outline of a depression in the component. In this case, the mating contour of the mounting to be attached is then to be designed as an integral molding. In another example, the contour of the component may be formed by the outline of an integral molding, and the mating contour of the mounting to be attached is formed by the outline of a depression.

In some examples, the contour for attaching the mounting may be configured to have an H-shaped outline. Such an embodiment enables very good retention of an attached mounting, both in the vehicle longitudinal direction and in the vehicle lateral direction.

Such an effect can be even further enhanced when an H leg of the contour is oriented parallel to a customary driving direction.

In a case in which a mounting is attached to the component, the material of the mounting may be configured to be softer than the material of the component in the regions of the contour of the component and of the mating contour of the mounting, in some examples.

Such a configuration may help to prevent the component which forms the mechanical interface for mounting from being damaged by the mounting. It is considerably easier to replace a damaged mounting than to replace the component attached to the switch module.

Furthermore, such a configuration helps to provide a stable, firm seat of a mounting that is attached to the component when the dimensions of the contour of the component and of the mating contour of the mounting to be attached are selected in such a way that the contour causes the mating contour to be widened or to be compressed.

In some examples, the component may include connecting points for attaching a steering column shroud. Such an embodiment can facilitate or stabilize the attachment of a steering column shroud.

Figure 1:
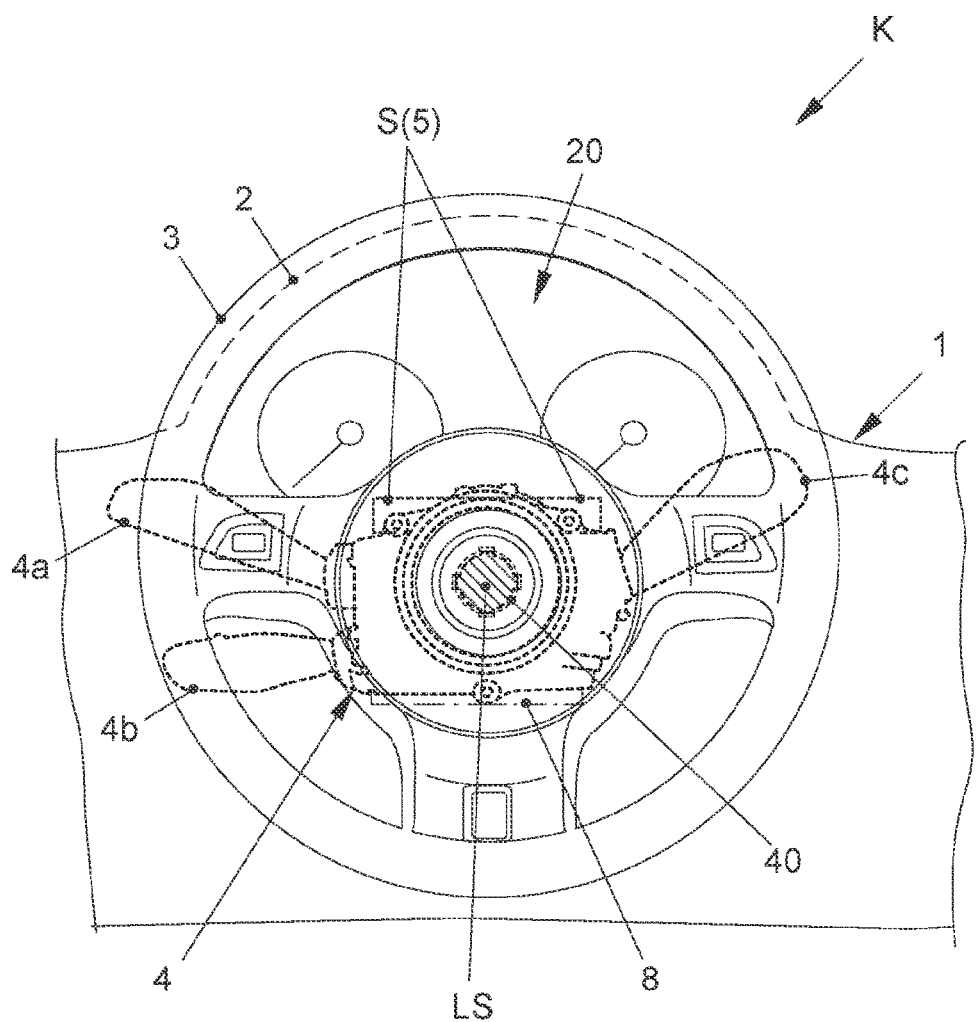
FIG. 1 shows the top view onto a steering column, which is surrounded by a switch module comprising an interface attached thereto, according to some aspects of the present disclosure.

Turning to FIG. 1, the drawing illustrates a motor vehicle K in a region of a cockpit thereof. A steering wheel 3 is arranged in front of an instrument panel 1 in this region. The steering wheel 3 is coupled to a steering column LS in terms of movement.

A switch module 4 for the steering column LS, which surrounds the steering column LS in this location, is configured behind the steering wheel 3, that is, between the instrument panel 1 and the steering wheel 3. Multiple levers 4a, 4b, and 4c extend from the switch module 4, which is equipped with an electronic system not shown in greater detail. The lever 4a is used for indicating a driving direction or for activating high beams, the lever 4b is used for actuating a cruise control system, and the lever 4c is used for actuating windshield wipers.

An instrument cluster 20 comprising round instruments, which is arranged beneath an instrument cowl 2 of the instrument panel 1, is also apparent behind the steering wheel 3.

Furthermore, a mechanical interface S is indicated with dotted lines. The interface S is designed as a separate component 5 attached to the switch module 4. The component 5, in turn, is used to attach a mounting 7 for an object O (see also FIG. 6).

Finally, an electronic steering column lock 8 is indicated with dotted lines in this figure, which is likewise attached to the switch module 4.

Figure 2:
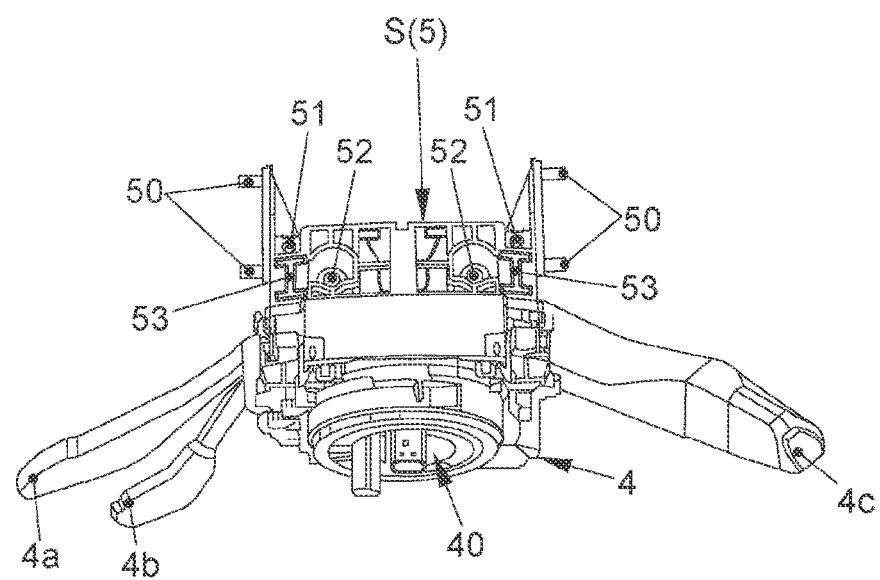
FIG. 2 shows a perspective individual representation of the switch module comprising an interface attached thereto according to some aspects of the present disclosure.

FIG. 2 shows the switch module 4, including the component 5, from above and in a slightly perspective view. It can be seen in the figure that the component 5 is attached to the switch module 4. The switch module 4 includes a through-opening 40, and the component 5 also includes a corresponding opening, for receiving the steering column LS (see also FIG. 1).

Attachment points 52 are used to attach the component 5 to the steering column lock (steering wheel lock), which is not shown in greater detail here. Furthermore, stud-like connecting points 50 are apparent, which are used to connect the component 5 to a steering column shroud. Finally, attachment points 51 for the aforementioned mounting 7 are apparent in this figure, which are used for the final screw assembly of the mounting 7 fixed by way of two contours 53.

Figure 3:
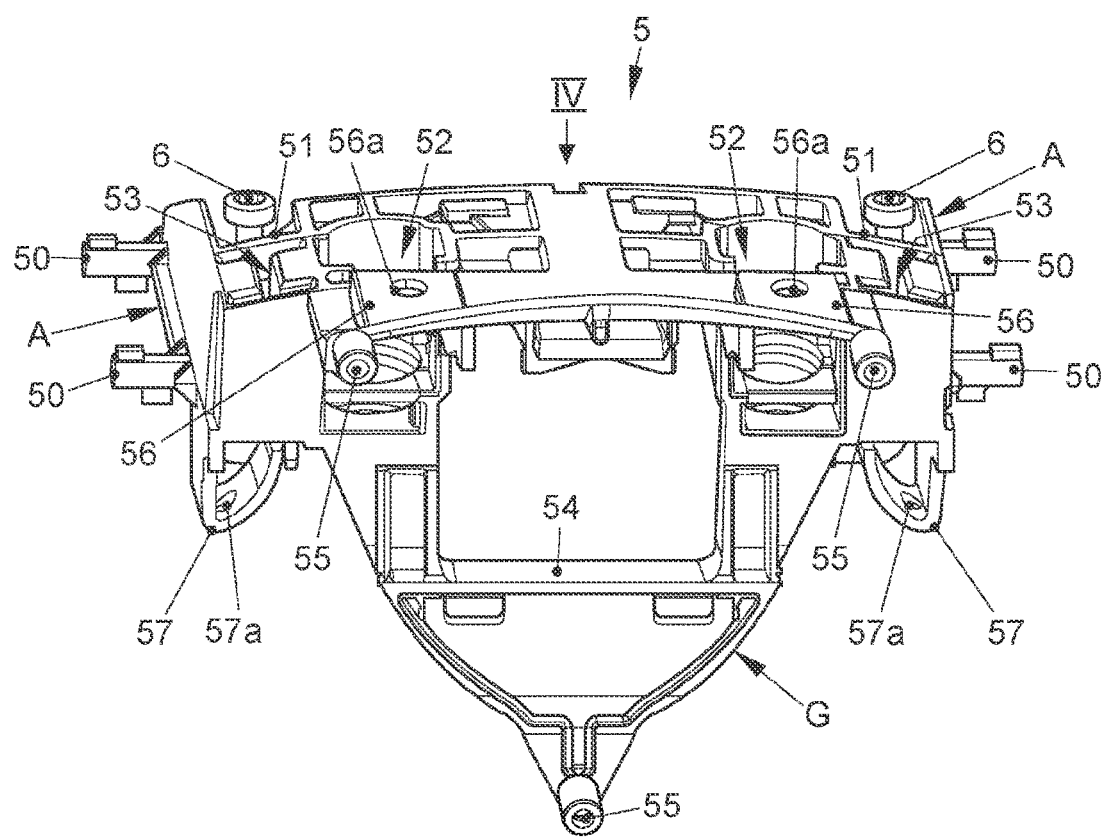
FIG. 3 shows a perspective individual representation of the interface according to some aspects of the present disclosure.
Figure 4:
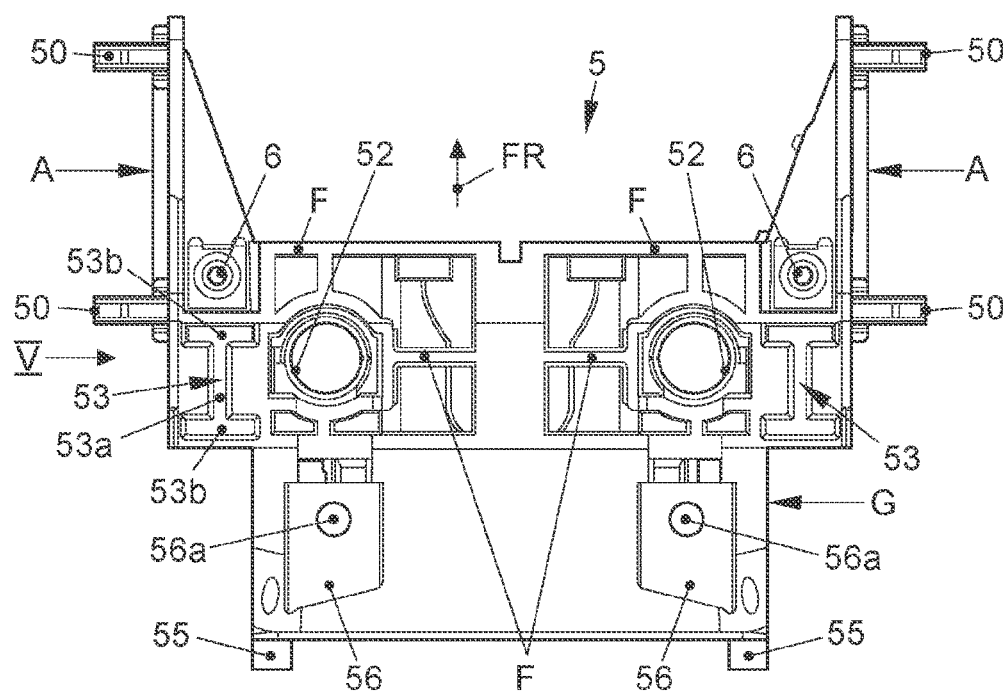
FIG. 4 shows a view of the interface according to view IV from FIG. 3 according to some aspects of the present disclosure.
Figure 5:
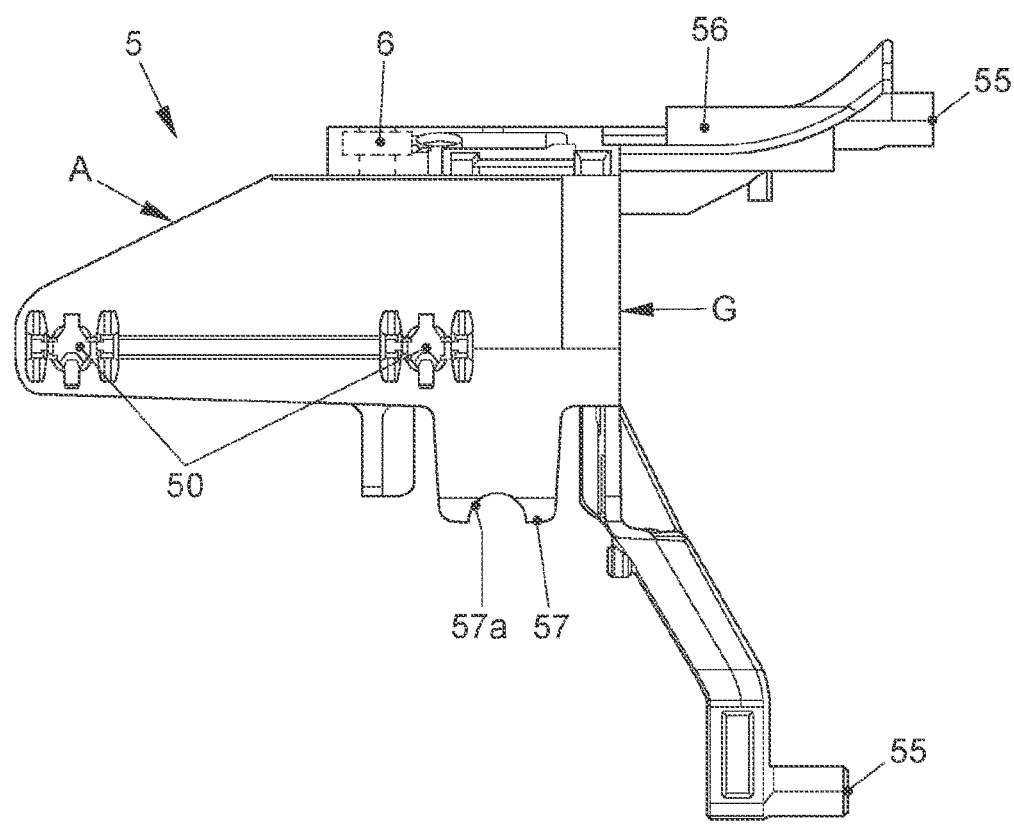
FIG. 5 shows a side representation of the interface according to view V from FIG. 4 according to some aspects of the present disclosure.

Based on FIGS. 3 to 5, the component 5 serving as an interface shall now be described in greater detail in an individual representation.

In the assembly orientation shown in the figures, the component 5 may include a frame-like base body G, which provides a rectangular, in particular square, receiving opening 54 for a portion of a steering column shroud. Furthermore, three attachment points 55, arranged in a triangular shape, for attaching the component 5 to the switch module 4 are present at the frame-like base body G. The attachment points 55 are designed as through-holes. The attachment points 52, which are used to attach the component 5 to a steering column lock, are likewise designed as through-openings.

In this example, two integral moldings 56 including through-openings 56a are present at the upper side of the base body G. The through-openings 56a serve as centering holes and/or as attachment holes for the steering column shroud.

Two integral moldings A are integrally formed laterally at the base body G, which point from the base body G toward the back, that is, in a driving direction FR, and include the aforementioned pin-like or stud-like connecting points 50 for the steering column shroud.

Two downwardly extending, hook-like integral moldings 57 are present in the region of the base body G. A free end of the hook-like integral moldings 57 is located on the inside and is directed upwardly. Openings 57a are introduced at the base of the hook-like integral moldings 57.

The hook-like integral moldings 57 serve as retaining lugs for pre-clipping the aforementioned electronic steering column lock 8 before it is screwed together with the switch module 4. In this regard, the hook-like integral moldings 57 help to facilitate the assembly of the electronic steering column lock 8 indicated in FIG. 1.

The aforementioned contours 53 for attaching the mounting 7 (see FIG. 6) will now be described in detail. Each of the contours 53 is formed by the outline of a depression introduced from above into the base body G. The outline of the depression, that is, the contour 53, in particular has an H-shaped design and includes an H leg 53a and two H sides 53b. The H leg 53a is oriented parallel to the driving direction FR.

Figure 6:
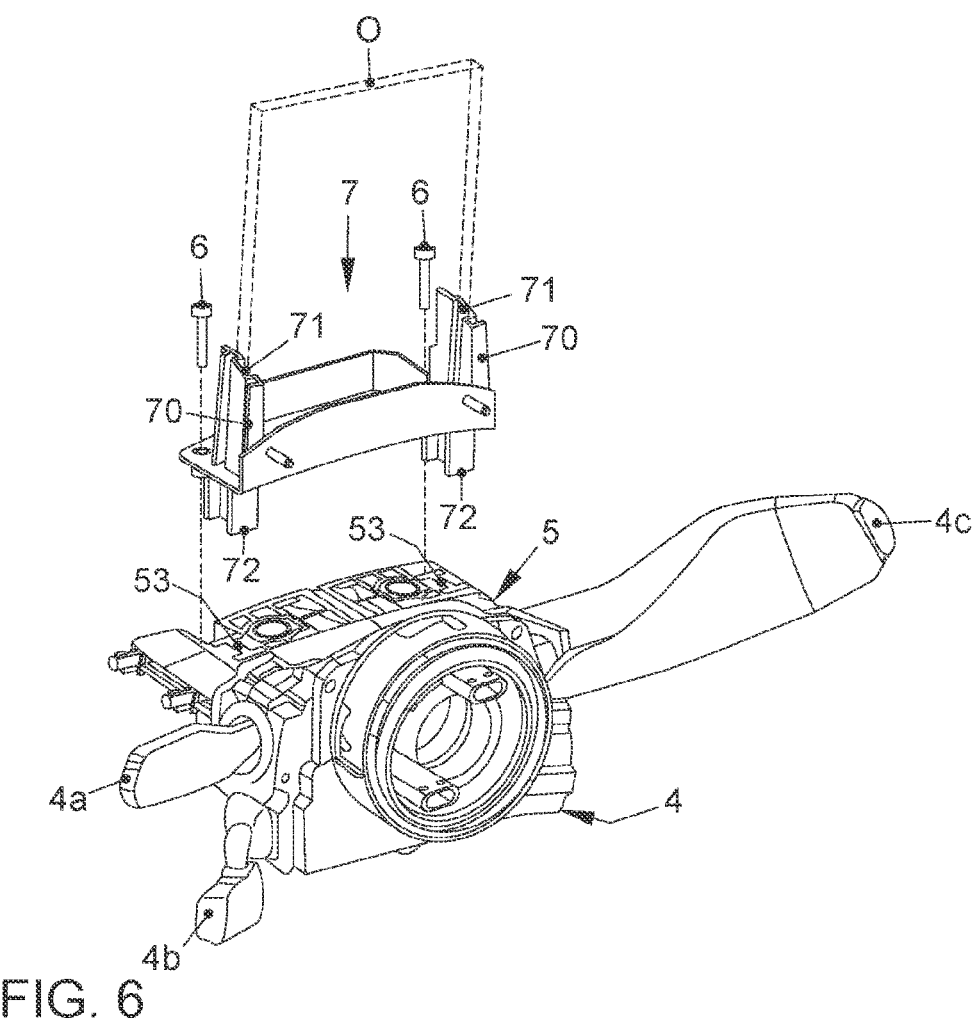
FIG. 6 shows a perspective exploded view of the assembly unit formed of the switch module and the interface, and a mounting for a mobile terminal to be attached thereto, according to some aspects of the present disclosure.

In FIG. 6, it can be seen that the mounting 7, which is to be attached to the component 5, includes two downwardly projecting mating contours 72 formed by the outlines of integral moldings. Each mating contour 72 is likewise designed to have an H-shaped outline, corresponding to the contour 53.

In some examples, the mounting 7 may be designed to be softer, at least in the region of the mating contours 72, than the component 5 in the region of the contours 53. For this purpose, it is conceivable to design the component 5 and/or the mounting 7 as a two-component part. In this way, it can be ensured that the contours 53 are not, or the component 5 is not, damaged when the mounting 7 is plugged into the contours 53 of the component 5.

The assembly of the mounting 7 is now carried out such that the mounting 7 is plugged with the mating contours 72 thereof from above into the contours 53.

In some examples, the outside dimensions of the mating contours 72 are preferably selected to be slightly larger than the dimensions of the contours 53. The mating contours 72 are thus slightly compressed when plugged into the contours 53. This helps to ensure that the mounting 7 is retained very firmly and securely in the component 5.

A final screw assembly of the mounting 7 can be carried out at the attachment points 51 by way of attachment means 6, which are preferably designed as screws. In the process, the mounting 7 rests with a downwardly directed bearing surface on a bearing surface F of the component 5. The bearing surface F of the component 5 is formed by rib-like protrusions in the region of the base body G.

The H-shaped configuration of the contours 53 or of the mating contours 72 results in a very secure fixation of the mounting 7, both in the vehicle longitudinal direction and in the vehicle lateral direction. Deviating from the exemplary embodiment, the contours 53 (and thus the corresponding mating contours 72) can also have a differently configured outline.

As can be seen from the figure, the mounting 7, in turn, may be used to mount an object O indicated with dotted lines. The object O can be a smart phone, an MP3 player, or the like, for example. For this purpose, the mounting 7 comprises upwardly directed holding arms 70, which are slightly preloaded to the inside. A vertically extending groove 71 in each of the holding arms 70 is used to insert the object O, wherein the holding arms 70 are moved apart from one another in a slightly spring-loaded manner, and rest with preload against the object O.

It should be understood by those skilled in the art that other configurations of the mounting 7 are possible. For example, the mounting 7 can be designed with a deposit area located at the top for depositing arbitrary objects, instead of the holding arms 70.

If the attachment of a mounting 7 should not be desired, the interface S or the component 5 can be covered by the portion of a steering column shroud or interior lining not shown in greater detail.

LIST OF REFERENCE SIGNS

1 instrument panel
2 instrument cowl
3 steering wheel
4 switch module for a steering column
4a lever for turn signal/high beams
4b lever for cruise control system
4c lever for windshield wiper actuation
5 component
6 attachment means
7 mounting
8 electronic steering column lock
20 instrument cluster
40 through-passage
50 connecting points for steering column shroud
51 attachment points for mounting
52 attachment points for steering column shroud
53 contour for attaching the mounting
53a H leg
53b H sides
54 receiving opening for portion of steering column shroud
55 attachment points for connection to switch module
56 integral moldings
56a through-openings
57 hook-like integral moldings
57a openings
70 holding arms
71 grooves
72 mating contour
A integral moldings
F bearing surface
G base body
FR driving direction
K motor vehicle
LS steering column
O object
S interface

The invention claimed is:

1. A steering column for a vehicle, comprising:
 a switch module, at least partially surrounding the steering column, the switch module comprising at least one actuating lever for triggering at least one function for the vehicle;
 a mechanical interface configured in a region of the switch module for attaching a mounting for an object,
 wherein the mechanical interface is further configured as a separate component attached to the switch module, wherein the separate component comprises an H-shaped contour for attaching the mounting,
 and wherein dimensions of the contour are configured to cause a mating contour to be widened or compressed during mating.

2. The steering column according to claim 1, wherein the contour for attaching the mounting is formed by an outline of a depression.

3. The steering column according to claim 1, wherein a leg of the H-shaped contour is oriented parallel to a driving direction of the vehicle.

4. The steering column according to claim 1, wherein the mounting is configured to be attached to the separate component, and wherein the material of the mounting is configured to be softer, at least in regions of the contour of the separate component and of the mating contour of the mounting, than the material of the separate component.

5. The steering column according to claim 1, wherein the separate component comprises attachment points for receiving a steering column shroud.

6. An assembly unit for a steering column for a vehicle, comprising:
 a switch module, at least partially surrounding the steering column, the switch module comprising at least one actuating lever for triggering at least one function for the vehicle;
 a mechanical interface configured in a region of the switch module for attaching a mounting for an object,
 wherein the mechanical interface is further configured as a separate component attached to the switch module,
 wherein the separate component comprises at least one H-shaped contour formed by an outline of a depression or by an outline of an integral molding, configured to be plugged into a mating contour of the mounting, formed by the outline of an integral molding or by the outline of a depression,
 and wherein dimensions of the contour are configured to cause the mating contour to be widened or compressed during mating.

7. The assembly unit according to claim 6, wherein a leg of the H-shaped contour is oriented parallel to a driving direction of the vehicle.

8. The assembly unit according to claim 6, wherein the mounting is configured to be attached to the separate component, and wherein the material of the mounting is configured to be softer, at least in regions of the contour of the separate component and of the mating contour of the mounting, than the material of the separate component.

9. The assembly unit according to claim 6, wherein the separate component comprises attachment points for receiving a steering column shroud.

10. A method for configuring an assembly unit for a steering column of a vehicle, comprising:
    providing a switch module, at least partially surrounding the steering column, the switch module comprising at least one actuating lever for triggering at least one function for the vehicle;
    configuring a mechanical interface in a region of the switch module for attaching a mounting for an object, wherein the mechanical interface is further configured as a separate component attached to the switch module, forming at least one contour on the separate component, the at least one H-shaped contour comprising an outline of a depression or an outline of an integral molding, configured to be mated into a mating contour of the mounting, formed by the outline of the depression or by the outline of the integral molding, and wherein dimensions of the contour and of the mating contour are configured to cause the mating contour to be widened or compressed during mating.

11. The method according to claim 10, wherein an Ha leg of the H-shaped contour is oriented parallel to a driving direction of the vehicle.

12. The method according to claim 10, wherein the mounting is configured to be attached to the separate component, and wherein the material of the mounting is configured to be softer, at least in regions of the contour of the separate component and of the mating contour of the mounting, than the material of the separate component.

13. The method according to claim 10, wherein the separate component comprises attachment points for receiving a steering column shroud.

* * * * *